US011708782B2

(12) United States Patent
Uchibori

(10) Patent No.: US 11,708,782 B2
(45) Date of Patent: Jul. 25, 2023

(54) TURBOCHARGED ENGINE ARRANGEMENT

(71) Applicant: Yanmar Power Technology Co., Ltd., Osaka (JP)

(72) Inventor: Masataka Uchibori, Osaka (JP)

(73) Assignee: Yanmar Power Technology Co., Ltd., Osaka (JP)

(*) Notice: Subject to any disclaimer, the term of this patent is extended or adjusted under 35 U.S.C. 154(b) by 37 days.

(21) Appl. No.: 17/440,868

(22) PCT Filed: Mar. 5, 2020

(86) PCT No.: PCT/JP2020/009337
§ 371 (c)(1),
(2) Date: Sep. 20, 2021

(87) PCT Pub. No.: WO2020/195664
PCT Pub. Date: Jan. 10, 2020

(65) Prior Publication Data
US 2022/0162979 A1   May 26, 2022

(30) Foreign Application Priority Data

Mar. 22, 2019  (JP) .................................. 2019-054476

(51) Int. Cl.
*F01N 13/18* (2010.01)
*F01N 13/10* (2010.01)
*F01N 3/24* (2006.01)

(52) U.S. Cl.
CPC .......... *F01N 13/1805* (2013.01); *F01N 3/24* (2013.01); *F01N 13/10* (2013.01); *F01N 2340/06* (2013.01); *F01N 2590/08* (2013.01)

(58) Field of Classification Search
CPC ........ F01N 3/24; F01N 13/10; F01N 13/1805; F01N 2340/06; F01N 2590/08
See application file for complete search history.

(56) References Cited

U.S. PATENT DOCUMENTS

2019/0101051 A1* 4/2019 Nakada ..................... F01N 5/04
2020/0080452 A1* 3/2020 Matsui ...................... F01P 5/04

FOREIGN PATENT DOCUMENTS

WO    WO-2015012168 A1 * 1/2015 ............. B60K 13/04

* cited by examiner

*Primary Examiner* — Audrey B. Walter
(74) *Attorney, Agent, or Firm* — Chris Mizumoto

(57) ABSTRACT

An engine is provided with an engine body, a crankshaft, a cooling fan, an exhaust manifold, a supercharger, an ATD that purifies exhaust gas, and a second exhaust pipe. When the height direction of the engine is defined as a first direction, the crankshaft extends in a second direction vertical to the first direction. The cooling fan is disposed on one side of the engine body in the second direction. The supercharger is driven by the exhaust gas from the exhaust manifold. The second exhaust pipe connects the supercharger and the ATD. The ATD is disposed in an attitude in which the longitudinal direction thereof is parallel to the second direction. The second exhaust pipe is connected to the cooling fan side of the ATD in the second direction. The second exhaust pipe is disposed so as to pass laterally with respect to the exhaust manifold and below the supercharger.

4 Claims, 7 Drawing Sheets

TURBOCHARGED ENGINE ARRANGEMENT

CROSS-REFERENCE

This application is a US National Stage Application under 35 U.S.C. § 371 of International Application No. PCT/JP2020/009337 filed Mar. 5, 2020, which claims foreign priority of JP2019-054476 filed Mar. 22, 2019, the disclosures of which are hereby incorporated by reference in their entirety.

TECHNICAL FIELD

The present invention relates to an engine including a turbocharger and an exhaust gas purification device. In detail, the present invention relates to an arrangement of a connection pipe connecting a turbocharger and an exhaust gas purification device.

BACKGROUND ART

Conventionally, an engine in which an exhaust gas purification device is arranged above the engine body is known. Patent Literature 1 discloses an engine of this type.

The engine of Patent Literature 1 has a configuration in which an exhaust gas inlet of a DPF which is an exhaust gas purification device is disposed on a side that is near an exhaust gas outlet of a turbocharger, and an exhaust gas passage between the turbocharger and the DPF is formed to be short. DPF is an abbreviation for Diesel Particulate Filter.

CITATION LIST

Patent Literature

Patent Literature 1: Japanese Unexamined Patent Application Publication No. 2012-72722

DISCLOSURE OF INVENTION

Problems to be Solved by the Invention

However, since the temperature of exhaust gas is generally high, in the above-described configuration of Patent Literature 1, thermal expansion may occur in each of the exhaust gas inlet pipe of the DPF and the housing support body, which configure an exhaust gas passage, and damage may occur at the connection part with other parts and the like.

On the other hand, in a case where the exhaust gas inlet of the DPF is disposed on a different side of the exhaust gas outlet of the turbocharger, the thermal expansion caused by the exhaust gas can be absorbed by forming the exhaust gas passage part which connects the turbocharger and the DPF to be long. However, in this case, it is difficult to lay out the exhaust gas passage part in a rational manner while taking the compactness of the engine into consideration.

The present invention was made in consideration of the above circumstances, and the goal thereof is to provide a compact engine while avoiding components and the like from being damaged due to thermal expansion.

Means for Solving the Problems and Effect of the Invention

The problem to be solved by the present invention is as described above, and the means for solving the problem and the effect thereof will be explained in the following.

According to an aspect of the present invention, an engine having the configuration below is provided. That is, this engine includes an engine body, a crankshaft, a cooling fan, an exhaust manifold, a turbocharger, an exhaust gas purification device, and a connection pipe. When a height direction of the engine is a first direction, the crankshaft extends in a second direction, which is a direction perpendicular to the first direction. The cooling fan is arranged on one side of the engine body in the second direction. The turbocharger is to be driven by exhaust gas from the exhaust manifold. The exhaust gas purification device is to purify the exhaust gas from the exhaust manifold. The connection pipe is to connect the turbocharger and the exhaust gas purification device. The exhaust gas purification device is arranged in such a posture that a longitudinal direction thereof is parallel to the second direction. The connection pipe is connected to the cooling fan side of the exhaust gas purification device in the second direction. The connection pipe is arranged on a side of the exhaust manifold so as to pass below the turbocharger.

Accordingly, it is possible to arrange the connection pipe so as not to protrude outwardly from the turbocharger, so that a more rational layout of the connection pipe can be obtained while making the engine more compact. Further, since the connection pipe can be formed so as to be relatively long, thermal expansion caused by high temperature exhaust gas can be absorbed.

It is preferable that the above-described engine has the configuration below. That is, the connection pipe has a straight part extending in parallel to the second direction. The exhaust manifold and the turbocharger are arranged above a lower end of the straight part.

Accordingly, since the turbocharger, which is relatively large in outline, is arranged on the upper side, a space for arranging the connection pipe and other devices can be thereby easily secured below the turbocharger.

It is preferable that the above-described engine has the configuration below. That is, when a direction that is perpendicular to both of the first direction and the second direction is a third direction, the turbocharger is arranged on one side of the engine body in the third direction. When viewed in an orientation along the third direction, the straight part is arranged so as to at least partially overlap the exhaust manifold and be vertically adjacent to the turbocharger. When viewed in an orientation along the second direction, the straight part is arranged so as to be mutually adjacent to the exhaust manifold in the third direction.

Accordingly, by arranging the connection pipe, the turbocharger, and the exhaust manifold in a cohesive space in the middle part of the engine in the first direction, the length of the engine in the third direction can be made compact. Further, it is possible to secure a wide space for arranging other devices below the connection pipe.

It is preferable that the above-described engine has the configuration below. That is, when a direction perpendicular to both of the first direction and the second direction is a third direction, the turbocharger is arranged on one side of the engine body in the third direction. The connection pipe is arranged on a side of the turbocharger that is near the engine body in the third direction relative to an end part on a side of the turbocharger that is far from the engine body in the third direction.

Accordingly, the connection pipe can be arranged so as to fit on the inner side relative to the turbocharger in the third direction. Therefore, the engine can be made compact in the third direction.

DESCRIPTION OF EMBODIMENTS

Figure 1:
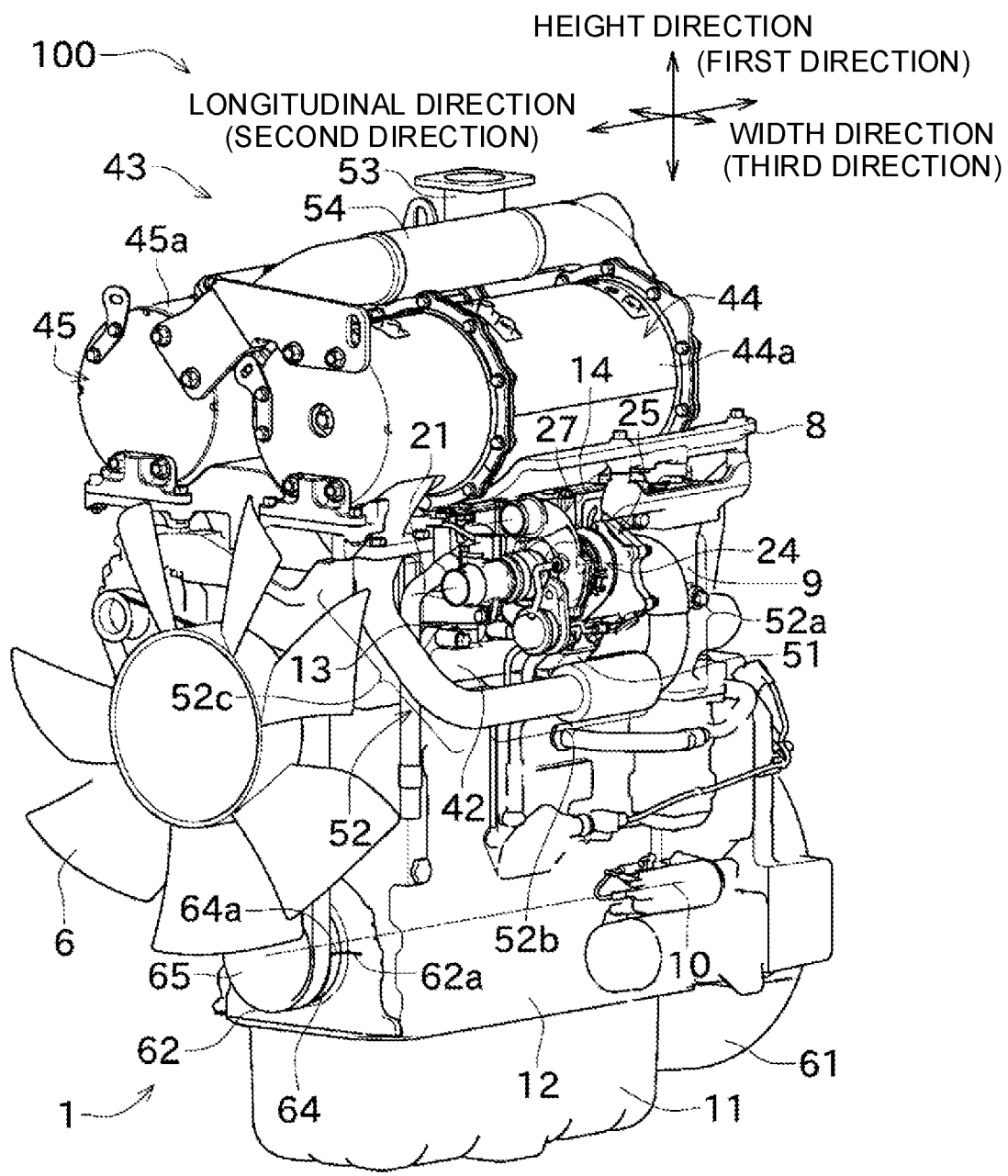
FIG. 1 is a perspective view illustrating a configuration of an engine according to an embodiment of the present invention.
Figure 2:
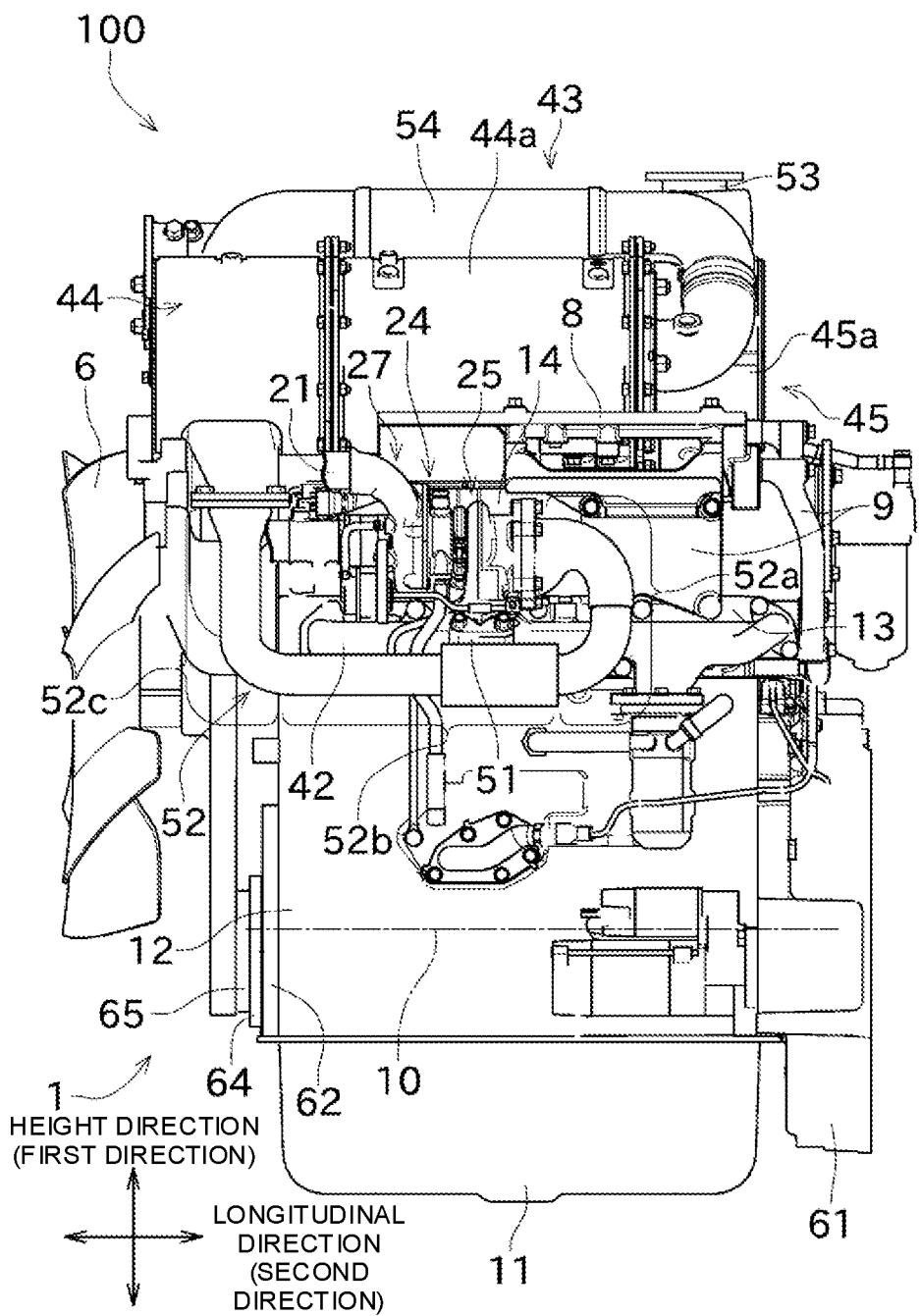
FIG. 2 is a side view of the engine viewed in an orientation along a width direction.
Figure 3:
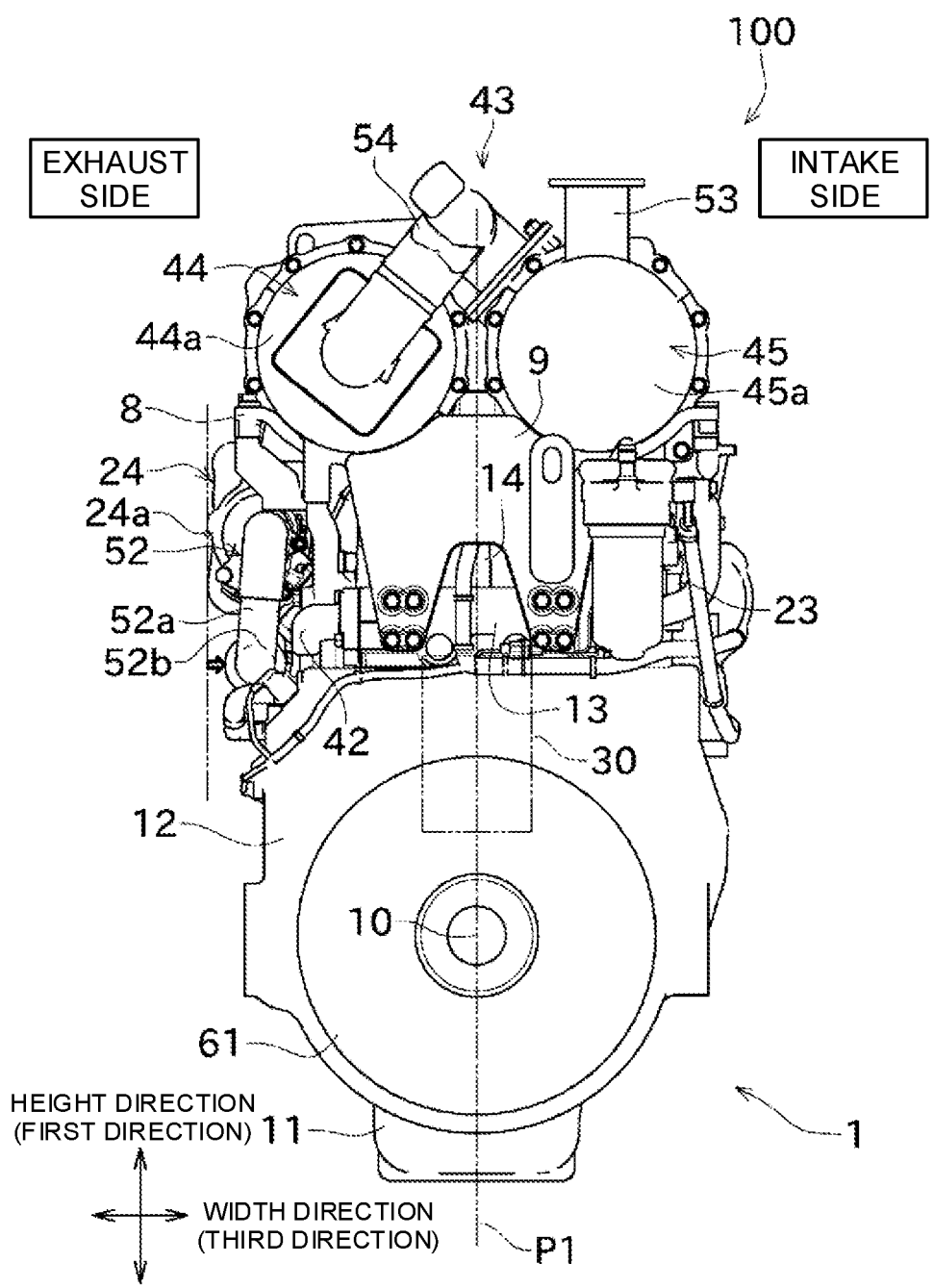
FIG. 3 is a side view of the engine viewed from a flywheel housing side.
Figure 4:
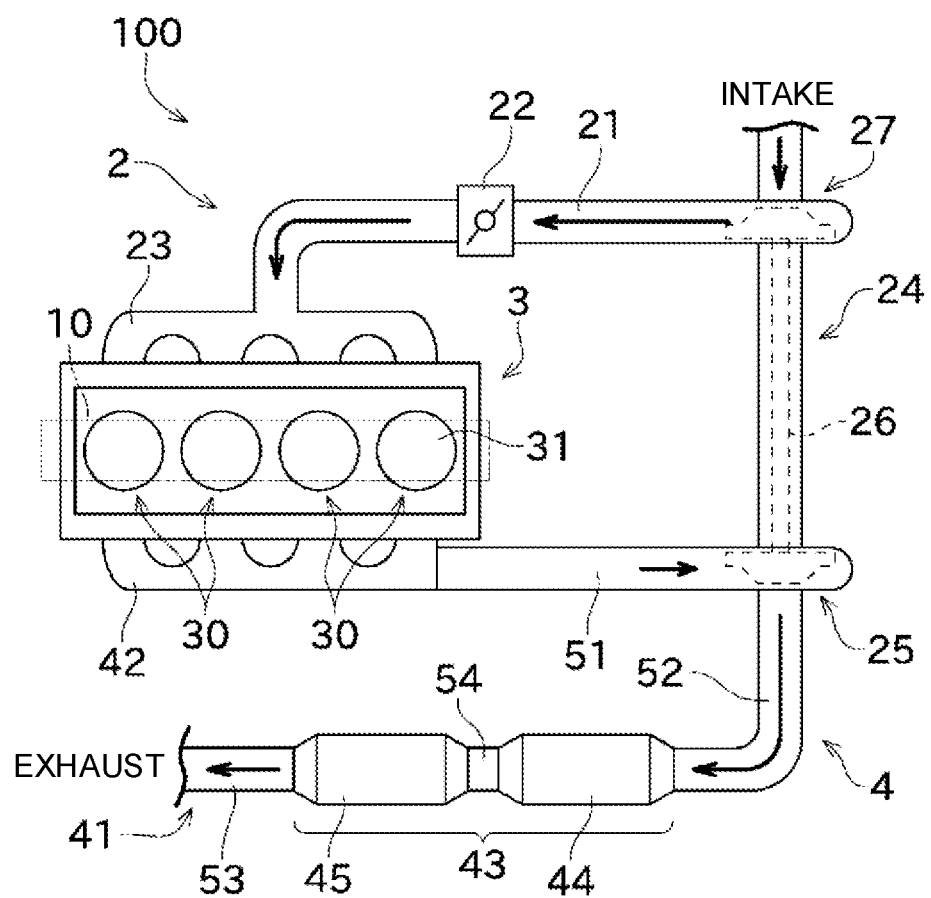
FIG. 4 is a conceptual diagram illustrating intake and exhaust flows in the engine.
Figure 5:
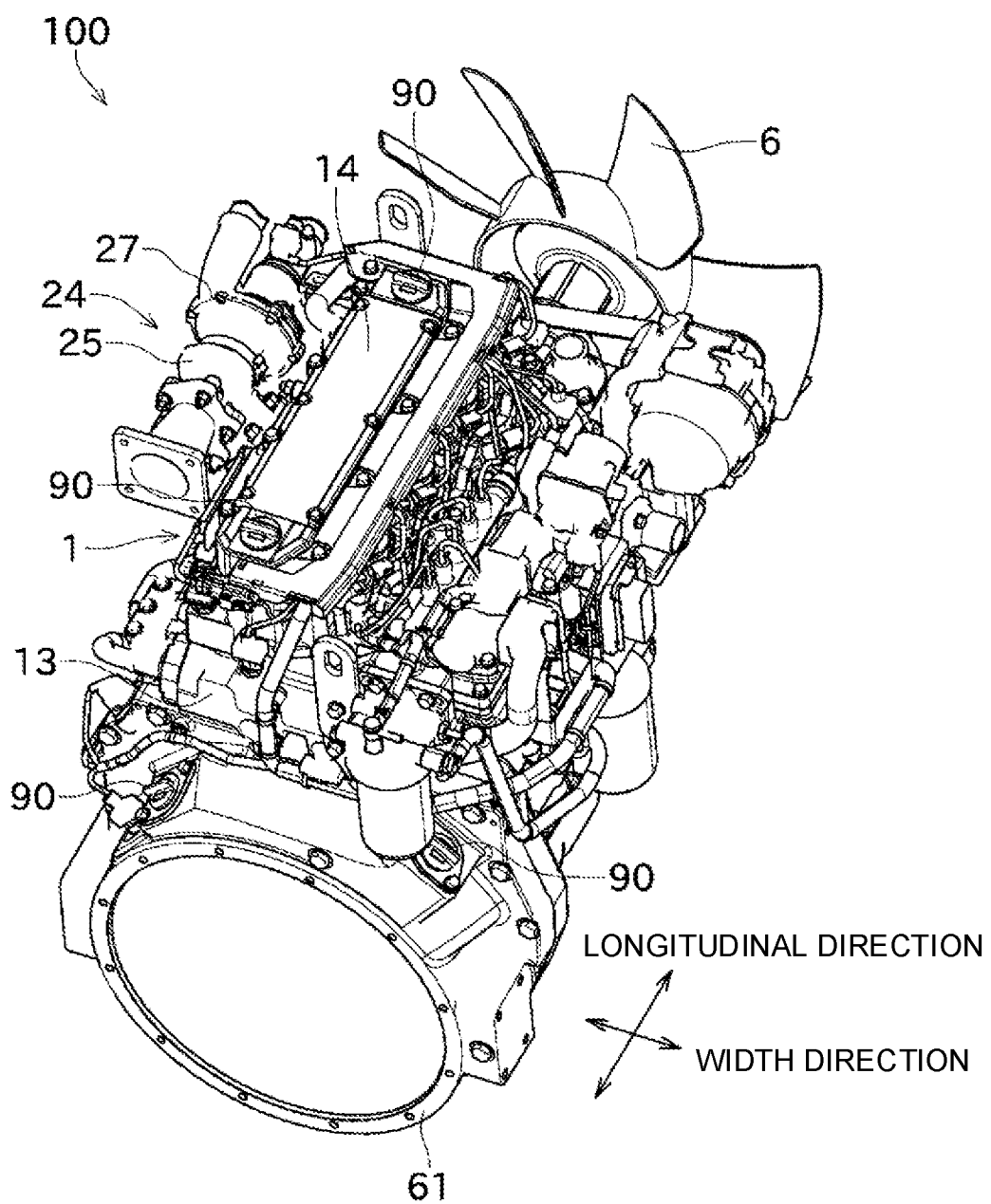
FIG. 5 is a perspective view of an oil supply port.

Next, an embodiment of the present invention will be explained with reference to the drawings. FIG. 1 is a perspective view illustrating a configuration of the engine 100 according to an embodiment of the present invention. FIG. 2 is a side view of the engine 100 viewed in an orientation along the width direction. FIG. 3 is a side view of the engine 100 viewed from the flywheel housing 61 side. FIG. 4 is a conceptual diagram illustrating intake and exhaust flows in the engine 100. FIG. 5 is a perspective view of the oil supply port 90.

The engine 100 illustrated in FIG. 1 is a diesel engine, which is to be mounted on, for example, an agricultural machine such as a tractor, a construction machine such as a skid-steer loader, etc. The engine 100 is configured as, for example, an in-line 4-cylinder engine having four cylinders. Note that the number of cylinders is not limited to four.

First, the basic configuration of the engine body 1 included in the engine 100 will be explained. Note that, in the explanation below, the vertical direction of the engine 100 illustrated in FIG. 1 is referred to as the height direction. The engine 100 has an elongated approximately rectangular shape in a plan view, and the longitudinal direction thereof is aligned with the direction in which the crankshaft 10 extends. In the explanation below, the longitudinal direction of the engine 100 means the axial direction of the crankshaft 10. Further, the direction perpendicular to both of the height direction and the longitudinal direction is referred to as the width direction of the engine 100. The height direction of the engine 100 corresponds to the first direction, the longitudinal direction corresponds to the second direction, and the width direction corresponds to the third direction.

As illustrated in FIG. 1, etc., the engine body 1 is mainly configured with the oil pan 11, the cylinder block 12, the cylinder head 13, and the head cover 14, which are arranged in order from below.

The oil pan 11 is disposed at a lower part (lower-side end part) of the engine 100. The oil pan 11 is formed in the shape of a container whose upper part is open. Inside the oil pan 11, engine oil for lubricating the engine 100 is stored.

The engine oil stored in the oil pan 11 is taken in by an engine oil pump, which is not illustrated in the drawings but disposed in the engine body 1, and then is supplied to each part of the engine body, and thereafter, the engine oil is returned to and stored in the oil pan 11 after lubricating the engine body 1.

By the way, in a case where a vehicle body on which the engine 100 is mounted is stored for a long period of time without being used, there may be a phenomenon in which engine oil moves to the lower part because of gravity, and the amount of oil film in each of the moving parts, which are to be lubricated, becomes insufficient.

As a countermeasure to this phenomenon, in a case where the engine 100 has been out of operation for a long period of time, there is a method in which the engine oil is replenished from a relatively high position before the engine 100 is started, so that, when the engine 100 is started, the amount of oil film that can sufficiently lubricate each part of the engine 100 is achieved in a short period of time.

In the engine 100 of the present embodiment, multiple oil supply ports 90 are disposed for replenishing engine oil. Specifically, as illustrated in FIG. 5, the oil supply ports 90 are disposed on the both sides of the head cover 14 in the longitudinal direction of the engine 100, respectively, and the oil supply ports 90 are disposed on the both sides of the upper side of the flywheel housing 61 in the width direction, respectively. That is, in the engine 100 of the present embodiment, the four oil supply ports 90 in total are disposed at different positions in the longitudinal direction and at different positions in the width direction, respectively.

Accordingly, it is possible to select the oil supply port 90 from which the engine oil is easily replenished in accordance with the posture of the vehicle body on which the engine 100 is mounted and the arrangement positions of the surrounding obstacles, so that the convenience of the engine 100 can be improved.

The cylinder block 12 is mounted on the upper side of the oil pan 11. A recess part for accommodating the crankshaft 10, etc., is formed in the lower part of the cylinder block 12. Although omitted in FIG. 1, the multiple cylinders 30 are formed on the upper part of the cylinder block 12 as illustrated in FIG. 3 and FIG. 4. The four cylinders 30 are arranged side by side along the axial direction of the crankshaft 10.

A piston is housed in each cylinder 30. The piston inside a cylinder 30 can move in the vertical direction. The piston is connected to the crankshaft 10 via a connecting rod which is not illustrated in the drawings. The crankshaft 10 rotates as the pistons reciprocate in the respective cylinders 30.

As illustrated in FIG. 2, etc., the cylinder head 13 is mounted on the upper side of the cylinder block 12. The cylinder head 13 and the cylinder block 12 form the combustion chambers 31 illustrated in FIG. 4 corresponding to the respective cylinders 30.

The head cover 14 is disposed on the upper side of the cylinder head 13. Inside the head cover 14, there is housed a valve operating mechanism configured with a push rod, rocker arm, etc., which are not illustrated in the drawings, for operating an intake valve and exhaust valve, which are not illustrated in the drawings.

The cooling fan 6 is mounted on one side of the engine body 1 in the longitudinal direction of the engine 100 in a rotatable manner. The cooling fan 6 rotates by transmission of the power from the crankshaft 10. The cooling fan 6 generates an air flow by rotating, in order to allow air to pass through a radiator (not illustrated in the drawings) for cooling the cooling water of the engine 100 and to blow air to the engine 100. As a result, the engine 100 is cooled.

The flywheel housing 61 is arranged on the side opposite to the cooling fan 6 in the longitudinal direction of the engine 100. Although not illustrated in the drawings, a flywheel of the engine 100 is arranged inside the flywheel housing 61.

Subsequently, focusing on the intake and exhaust flows, the configuration of the engine 100 of the present embodiment will be briefly explained with reference to FIG. 4, etc.

As illustrated in FIG. 4, the engine 100 includes the intake unit 2, the power generation unit 3, and the exhaust unit 4 as main configurations.

The intake unit 2 intakes air from the outside. The intake unit 2 includes the intake pipe 21, the throttle valve 22, the intake manifold 23, and the turbocharger 24.

The intake pipe 21 configures an intake passage, so that air taken in from the outside can flow to the inside.

The throttle valve 22 is arranged in the middle part of the intake passage. The throttle valve 22 changes the cross-sectional area of the intake passage by changing the opened degree thereof according to a control command from a control device which is not illustrated in the drawings. Accordingly, the amount of air supplied to the intake manifold 23 can be adjusted.

The intake manifold 23 is connected to the downstream end part of the intake pipe 21 in the direction of the intake flow. The intake manifold 23 distributes the air supplied via the intake pipe 21 according to the number of cylinders 30 and supplies the air to the combustion chambers 31 formed in the cylinders 30, respectively.

As illustrated in FIG. 3, the intake manifold 23 is mounted on a lateral surface of the cylinder head 13 which is formed in an approximately rectangular parallelepiped shape. When the virtual plane P1 including the rotation center of the crankshaft 10 and the four cylinders 30 is considered as illustrated in FIG. 3, the intake manifold 23 is arranged on one side of the virtual plane P1.

Of the lateral surfaces of the cylinder head 13, the later-described exhaust manifold 42 is mounted on a surface on the opposite side of the side where the intake manifold 23 is mounted. The exhaust manifold 42 is arranged on the opposite side of the intake manifold 23 with reference to the virtual plane P1. In the following explanation, in the width direction of the engine 100, the side where the intake manifold 23 is arranged may be referred to as the intake side, and the side where the exhaust manifold 42 is arranged may be referred to as the exhaust side. In FIG. 2, a side surface of the exhaust side of the engine 100 is illustrated.

The power generation unit 3 is configured with multiple (four in the present embodiment) cylinders 30. The power generation unit 3 generates power to reciprocate the pistons by burning fuel in the combustion chambers 31 formed in the respective cylinders 30.

Specifically, in each combustion chamber 31, the air supplied from the intake manifold 23 is compressed, and then the fuel supplied from a fuel supply unit, which is not illustrated in the drawings, is injected. Accordingly, combustion occurs in the combustion chambers 31, so that the pistons can be reciprocated up and down. The power thereby obtained is transmitted to an appropriate device on the downstream side of the power via the crankshaft 10, etc.

As illustrated in FIG. 4, the turbocharger 24 includes the turbine 25, the shaft 26, and the compressor 27. The compressor 27 is connected to the turbine 25 via the shaft 26. In this way, the compressor 27 rotates with the rotation of the turbine 25 which rotates by use of the exhaust gas discharged from the combustion chambers 31, so that the air purified by an air cleaner, which is not illustrated in the drawings, is compressed and forcibly taken in.

The turbocharger 24 is arranged above the exhaust manifold 42 as illustrated in FIG. 1, etc. On the side surface (the side surface on the exhaust side) illustrated in FIG. 2, the turbocharger 24 is arranged between the exhaust manifold 42 and the later-described ATD 43. Further, as illustrated in FIG. 3, when viewed in an orientation along the longitudinal direction of the engine 100, the turbocharger 24 is located on the outer side of the engine 100 relative to the exhaust manifold 42 in the width direction.

As illustrated in FIG. 3, when viewed in an orientation along the longitudinal direction of the engine 100, the turbocharger 24 is arranged so as to be at least partially located below the ATD 43 (specifically, the later-described DPF device 44). Accordingly, the engine 100 can be made compact in the width direction.

The turbocharger 24 is arranged so that the rotation axis of the shaft 26 extends along the longitudinal direction of the engine 100. As illustrated in FIG. 2, the turbine 25 included in the turbocharger 24 is arranged on the side that is near the flywheel housing 61, and the compressor 27 is arranged on the side that is near the cooling fan 6.

The exhaust unit 4 illustrated in FIG. 4 discharges the exhaust gas generated inside the combustion chambers 31 to the outside. The exhaust unit 4 includes the exhaust pipe 41, the exhaust manifold 42, and the ATD (exhaust gas purification device) 43. ATD is an abbreviation for After Treatment Device.

The exhaust pipe 41 configures an exhaust gas passage, and the exhaust gas discharged from the combustion chambers 31 can flow to the inside thereof. The exhaust pipe 41 is equipped with the first exhaust pipe 51, the second exhaust pipe (connection pipe) 52, and the third exhaust pipe 53. The first exhaust pipe 51, the second exhaust pipe 52, and the third exhaust pipe 53 are configured with metal pipes.

The first exhaust pipe 51 connects the exhaust manifold 42 and the turbocharger 24, so as to guide the exhaust gas from the exhaust manifold 42 to the turbine 25 of the turbocharger 24. The second exhaust pipe 52 connects the turbocharger 24 and the ATD 43, so as to guide the exhaust gas that has passed through the turbine 25 of the turbocharger 24 to the ATD 43. The third exhaust pipe 53 guides the exhaust gas that has passed through the ATD 43 to the outside.

The exhaust manifold 42 is connected to the upstream end part of the exhaust pipe 41 (that is, the first exhaust pipe 51) in the direction of the exhaust gas flow. The exhaust manifold 42 collectively guides the exhaust gas generated in each combustion chamber 31 to the first exhaust pipe 51.

The ATD 43 is a device that performs aftertreatment of the exhaust gas discharged from the cylinders 30. As illustrated in FIG. 4, the ATD 43 is arranged on the outlet side of the second exhaust pipe 52 in the exhaust gas flow. The ATD 43 purifies the exhaust gas by removing harmful components such as NOx (nitrogen oxides), CO (carbon monoxide), HC (hydrocarbons) and particulate matter contained in the exhaust gas.

The ATD 43 includes the DPF device 44 and the SCR device 45. SCR is an abbreviation for Selective Catalytic Reduction. The DPF device 44 and the SCR device 45 are connected to each other via the connecting pipe 54.

The DPF device 44 removes carbon monoxide, nitric oxide, particulate matter and the like contained in the exhaust gas via an oxidation catalyst and a filter, which are not illustrated in the drawings but housed inside the DPF case 44a illustrated in FIG. 1, etc. The oxidation catalyst is a catalyst configured of platinum, etc., for oxidizing (combusting) unburned fuel, carbon monoxide, nitric oxide and the like contained in the exhaust gas. The filter is arranged on the downstream side of the exhaust gas relative to the oxidation catalyst and is configured as, for example, a fall flow type filter. The filter collects particulate matter contained in the exhaust gas treated with the oxidation catalyst.

As illustrated in FIG. 1 and FIG. 2, the DPF case 44a is configured with an elongated approximately cylindrical hollow member. The DPF case 44a is mounted on the upper side of the engine body 1 so as to extend in the longitudinal direction of the engine 100. The DPF case 44a is mounted on the exhaust side (the side where the turbocharger 24 and the exhaust manifold 42 are located) relative to the later-described SCR case 45a in the width direction of the engine 100.

As illustrated in FIG. 2, the exhaust gas inlet (that is, the part connecting to the exhaust pipe 41) in the DPF case 44a is formed at the end part of the DPF case 44a on the side that is near the cooling fan 6 in the longitudinal direction of the DPF case 44a.

In this way, the exhaust gas inlet of the DPF device 44 and the exhaust gas outlet of the turbocharger 24 are located on different sides of each other in the longitudinal direction of the engine 100. Accordingly, the second exhaust pipe 52, which connects the DPF device 44 and the turbocharger 24, can be formed so as to be relatively long.

Inside the DPF device 44, exhaust gas flows from the side that is near the cooling fan 6 toward the side that is near the flywheel housing 61. The exhaust gas that has passed through the DPF device 44 flows into the connecting pipe 54. The connecting pipe 54 has a straight part arranged approximately in parallel to the DPF device 44 and the SCR device 45. In the connecting pipe 54, exhaust gas flows from the side that is near the flywheel housing 61 toward the side that is near the cooling fan 6. The exhaust gas is mixed with urea that is supplied from a urea supply device, which is not illustrated in the drawings, in the connecting pipe 54. Thereafter, the exhaust gas flows from the connecting pipe 54 to the SCR device 45.

The SCR device 45 removes NOx contained in the exhaust gas via a slip catalyst and an SCR catalyst housed in the SCR case 45a illustrated in FIG. 1, etc. The SCR catalyst is configured of a material such as ceramic that adsorbs ammonia. NOx contained in the exhaust gas is reduced by contact with the SCR catalyst adsorbing ammonia and changed into nitrogen and water. The slip catalyst is used for preventing ammonia from being released to the outside. The slip catalyst is a catalyst such as platinum that oxidizes ammonia so as to change ammonia into nitrogen and water by oxidization.

As illustrated in FIG. 1, the SCR case 45a is configured with an elongated approximately cylindrical hollow member as with the DPF case 44a. The SCR case 45a is mounted on the upper side of the engine body 1 so as to extend in the longitudinal direction of the engine 100. The SCR case 45a is mounted on the intake side relative to the DPF case 44a in the width direction of the engine 100. That is, the DPF case 44a and the SCR case 45a are mounted side by side in the width direction of the engine 100.

As illustrated in FIG. 1, the exhaust gas inlet in the SCR case 45a is formed at the end part on the side that is near the cooling fan 6 in the longitudinal direction of the SCR case 45a. The exhaust gas outlet in the SCR case 45a is formed at the end part on the side that is near the flywheel housing 61 in the longitudinal direction of the SCR case 45a.

Inside the SCR device 45, exhaust gas flows from the side that is near the cooling fan 6 toward the side that is near the flywheel housing 61. The exhaust gas that has passed through the SCR device 45 is discharged to the outside via the third exhaust pipe 53 connected to the exhaust gas outlet of the SCR case 45a.

The DPF case 44a and the SCR case 45a are arranged side by side in the width direction of the engine 100. Both of the DPF case 44a and the SCR case 45a are mounted on the support base 8, which is arranged on the upper side of the head cover 14. The support base 8 is mounted on the engine body 1 via the support bracket 9.

In this way, the ATD 43 (the DPF device 44 and the SCR device 45) is mounted on the upper side of the engine body 1 in such a posture that the longitudinal direction thereof is parallel to the longitudinal direction of the engine 100 (that is, a posture parallel to the crankshaft 10). By arranging the elongated ATD 43 along the longitudinal direction of the engine 100 as described above, the width direction of the engine 100 can be short even if the length of the ATD 43 is changed depending on the specification of the engine 100. Therefore, the engine 100 of the present embodiment can be made compact in the width direction, and therefore, for example, it is preferable that the engine 100 is applied to a small tractor, etc., in which an engine needs to be housed inside a thin bonnet.

Subsequently, the configuration and arrangement of the second exhaust pipe 52, which connects the turbocharger 24 and the DPF device 44 of the ATD 43, will be explained with reference to FIG. 1 to FIG. 3.

The second exhaust pipe 52 is formed to bypass the lower side of the turbocharger 24, as illustrated in FIG. 1 and FIG. 2. The second exhaust pipe 52 includes the upstream part 52a, the middle part (straight part) 52b, and the downstream part 52c.

As illustrated in FIG. 2, the upstream part 52a has a bend in a lateral U-shape when viewed in an orientation along the width direction of the engine 100. The end part on one side of the upstream part 52a in the longitudinal direction is connected to the turbine 25 side of the turbocharger 24, and the end part on the other side in the longitudinal direction is connected to the middle part 52b. The upstream part 52a guides the exhaust gas that has passed through the turbine 25 of the turbocharger 24 to the middle part 52b.

The upstream part 52a is arranged on the side that is nearer the flywheel housing 61 relative to the turbocharger 24 in the longitudinal direction of the engine 100. As illustrated in FIG. 3, the upstream part 52a is arranged so as to extend in a direction which includes the height direction component of the engine 100 when viewed in an orientation along the longitudinal direction of the engine 100.

The middle part 52b is a part that connects the upstream part 52a and the downstream part 52c, so as to guide the exhaust gas guided from the upstream part 52a to the downstream part 52c. The middle part 52b is configured with a straight pipe. The middle part 52b is arranged so as to extend in the longitudinal direction of the engine 100. Exhaust gas of the middle part 52b flows from the side that is near the flywheel housing 61 toward the side that is near the cooling fan 6.

As illustrated in FIG. 1 and FIG. 2, the middle part 52b is arranged in the vicinity of the upper end part of the cylinder block 12 below the turbocharger 24. When viewed in an orientation along the width direction of the engine 100, the middle part 52b is arranged in the lower vicinity of the turbocharger 24 as illustrated in FIG. 2. That is, the turbocharger 24 and the middle part 52b are arranged so as to be adjacent to each other in the vertical direction.

As illustrated in FIG. 3, when viewed in an orientation along the longitudinal direction of the engine 100, the middle part 52b is arranged on the inner side relative to the turbocharger 24. Of the both ends of the turbocharger 24 in the third direction, when focusing on the end part 24a on the side that is far from the cylinders 30, the middle part 52b is arranged on the side that is nearer the cylinders 30 relative to the end part 24a. Therefore, when viewed from above along the height direction of the engine 100 (that is, in a plan view of the engine 100), the middle part 52*b* has a part that is completely hidden by the turbocharger 24.

As illustrated in FIG. 1 and FIG. 3, the middle part 52*b* is arranged on the side of the exhaust manifold 42, which is located below the turbocharger 24. The middle part 52*b* is arranged on the outer side relative to the exhaust manifold 42 in the width direction of the engine 100.

As illustrated in FIG. 3, the middle part 52*b* is arranged so as to be mutually adjacent to the exhaust manifold 42 in the width direction of the engine 100. As illustrated in FIG. 2, when the side surface of the exhaust side of the engine 100 is viewed in an orientation along the width direction of the engine 100, the middle part 52*b* overlaps a part of the exhaust manifold 42. That is, a part (lower part) of the exhaust manifold 42 is hidden by the middle part 52*b*.

Specifically, the lower end of the middle part 52*b* is located below the lower end of the exhaust manifold 42. The upper end of the middle part 52*b* is located below the upper end of the exhaust manifold 42. That is, the turbocharger 24 and the exhaust manifold 42 are arranged above the lower end of the middle part 52*b*.

As illustrated in FIG. 2, the downstream part 52*c* has a bend in an approximate L-shape when viewed in an orientation along the width direction of the engine 100. The end part of one side of the downstream part 52*c* in the longitudinal direction is connected to the middle part 52*b*, and the end part of the other side is connected to the exhaust gas inlet of the DPF device 44. The downstream part 52*c* guides the exhaust gas that has passed through the middle part 52*b* to the DPF device 44.

The downstream part 52*c* is arranged on the side that is nearer the cooling fan 6 relative to the turbocharger 24 in the longitudinal direction of the engine 100. Regarding the downstream part 52*c*, as illustrated in FIG. 2, the downstream part 52*c* has a part that is arranged so as to extend in a direction which includes the height direction component of the engine 100.

By having the configuration as described above, the turbocharger 24 and the second exhaust pipe 52 can be compactly arranged in the vicinity of the exhaust manifold 42, and the length in the width direction of the engine 100 can be made compact.

Further, as illustrated in FIG. 1 and FIG. 3, by arranging the second exhaust pipe 52 in the vicinity of the upper end part of the cylinder block 12, a wide space in which other devices can be arranged is formed below the turbocharger 24 and the second exhaust pipe 52. The other devices can be, for example, auxiliary devices such as an air compressor. Accordingly, since various auxiliary devices can be mounted on the engine body 1 of the engine 100 as required even under the assumption that the length of the engine 100 in the width direction remains almost unchanged, the degree of freedom of the components layout around the engine 100 can be improved.

Figure 6:
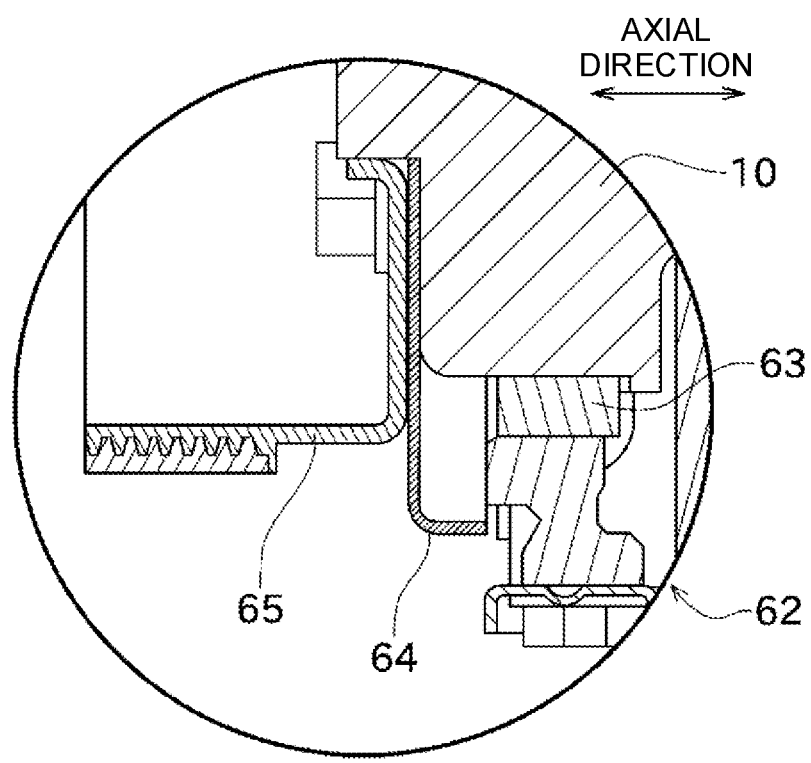
FIG. 6 is a partial cross-sectional view illustrating an oil seal and a seal cover.
Figure 7:
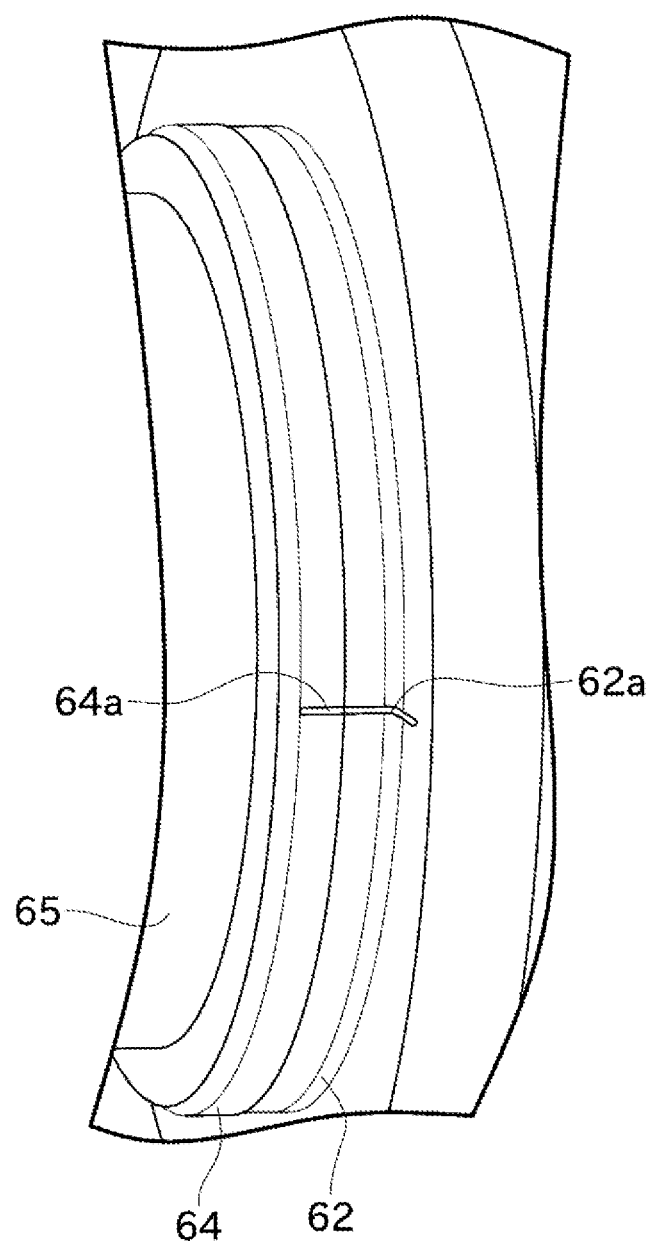
FIG. 7 is a partial perspective view illustrating a scale for the phase of a crankshaft.

Subsequently, the protective configuration of the oil seal 63 in the engine 100 of the present embodiment will be explained with reference to FIG. 6 and FIG. 7. FIG. 6 is a partial cross-sectional view illustrating the oil seal 63 and the seal cover 64. FIG. 7 is a partial perspective view illustrating a scale for identifying the phase of the crankshaft 10.

As illustrated in FIG. 6, in the engine 100 of the present embodiment, the oil seal 63 is disposed for filling the gap between the outer peripheral surface of the crankshaft 10 and the crankcase 62 mounted on the cylinder block 12. The oil seal 63 is configured of, for example, resin (rubber).

Since this oil seal 63 is disposed, it is thereby possible to prevent the engine oil in the crankcase 62 from being scattered to the outside due to the rotation of the crankshaft 10.

In the engine 100 of the present embodiment, the seal cover 64 is disposed for protecting the above-described oil seal 63. As illustrated in FIG. 2 and FIG. 6, this seal cover 64 is disposed on the opposite side of the cylinder block 12 in relation to the oil seal 63 interposed therebetween in the axial direction of the crankshaft 10. The seal cover 64 is arranged in the vicinity of the crankcase 62.

Accordingly, it is possible to avoid external dust, paint during painting of the engine 100, etc., from adhering to the oil seal 63, so that deterioration of the oil seal 63 can be suppressed and the service life thereof can be maintained for a long time.

As illustrated in FIG. 6, the seal cover 64 is fixed to the crankshaft 10 via bolts or the like together with the pulley 65 for transmitting power from the crankshaft 10 to the cooling fan 6. That is, the seal cover 64 rotates with the rotation of the crankshaft 10.

As illustrated in FIG. 7, the rotation-side scale 64*a*, which is a scale for externally checking the phase of the crankshaft 10, is formed on the outer periphery of the seal cover 64. Accordingly, the rotation-side scale 64*a* can be disposed at a position near the fixed-side scale 62*a* formed on the crankcase 62, which makes it possible to easily check misalignment of the fixed-side scale 62*a* and the rotation-side scale 64*a*, so that the visibility can be improved. As a result, during assemblage and maintenance of the engine 100, the phase of the crankshaft 10 can be easily checked, so that workability can be improved.

As explained above, the engine 100 of the present embodiment includes the engine body 1, the crankshaft 10, the cooling fan 6, the exhaust manifold 42, the turbocharger 24, the ATD 43, and the second exhaust pipe 52. When the height direction of the engine 100 is the first direction, the crankshaft 10 extends in the second direction which is perpendicular to the first direction. The cooling fan 6 is arranged on one side of the engine body 1 in the second direction. The turbocharger 24 is driven by exhaust gas from the exhaust manifold 42. The ATD 43 purifies the exhaust gas from the exhaust manifold 42. The second exhaust pipe 52 connects the turbocharger 24 and the ATD 43. The ATD 43 is arranged in such a posture that the longitudinal direction thereof is parallel to the second direction. The second exhaust pipe 52 is connected to the cooling fan 6 side of the ATD 43 in the second direction. The second exhaust pipe 52 is arranged on a side of the exhaust manifold 42 so as to pass below the turbocharger 24.

Accordingly, it is possible to arrange the second exhaust pipe 52 so as not to protrude outwardly from the turbocharger 24, so that a more rational layout of the second exhaust pipe 52 can be obtained in a more rational manner while making the engine 100 more compact. Further, since the second exhaust pipe 52 can be formed so as to be relatively long, thermal expansion caused by high temperature exhaust gas can be absorbed.

Further, in the engine 100 of the present embodiment, the second exhaust pipe 52 has the middle part 52*b* extending in parallel to the second direction. The exhaust manifold 42 and the turbocharger 24 are arranged above the lower end of the middle part 52*b*.

Accordingly, since the turbocharger 24, which is relatively large in outline, is arranged on the upper side, a space for arranging the second exhaust pipe 52 and other devices can be thereby easily secured below the turbocharger 24.

Further, in the engine 100 of the present embodiment, when the direction perpendicular to both of the first direction and the second direction is the third direction, the turbocharger 24 is arranged on one side of the engine body 1 in the third direction. When viewed in an orientation along the third direction, the middle part 52b is arranged so as to at least partially overlap the exhaust manifold 42 and be vertically adjacent to the turbocharger 24. When viewed in an orientation along the second direction, the middle part 52b is arranged so as to be mutually adjacent to the exhaust manifold 42 in the third direction.

Accordingly, by arranging the second exhaust pipe 52, the turbocharger 24, and the exhaust manifold 42 in a cohesive space in the middle part of the engine 100 in the first direction, the length of the engine 100 in the third direction can be made compact. Further, it is possible to secure a wide space for arranging other devices below the second exhaust pipe 52.

Further, in the engine 100 of the present embodiment, the turbocharger 24 is arranged on one side of the engine body 1 in the third direction. The second exhaust pipe 52 is arranged on the side that is near the engine body 1 in the third direction relative to the end part 24a of the turbocharger 24 on the side that is far from the engine body 1 in the third direction.

Accordingly, the second exhaust pipe 52 can be arranged so as to fit on the inner side relative to the turbocharger 24 in the third direction. Therefore, the engine 100 can be made compact in the third direction.

Although the preferred embodiment of the present invention is explained above, the above-described configuration can be modified as described below, for example.

It is also possible that the middle part 52b of the second exhaust pipe 52 is arranged so as to extend in a diagonal direction which includes a second direction component, not to be parallel to the second direction.

It is also possible that the ATD 43 is only equipped with the DPF device 44. In this case, it is also possible that the second exhaust pipe 52 is arranged so that the middle part 52b of the second exhaust pipe 52 passes above the turbocharger 24.

It is also possible that the exhaust manifold 42 is arranged so as to be entirely hidden by the middle part 52b when the side surface on the exhaust side of the engine 100 is viewed in an orientation along the width direction of the engine 100. In other words, it is also possible that the upper end of the middle part 52b is located above the upper end of the exhaust manifold 42.

When viewed in a plan view, the longitudinal direction of the approximately rectangular shape of the engine 100 can be perpendicular to the direction in which the crankshaft 10 extends. Further, the engine 100 can be approximately square when viewed in a plan view.

DESCRIPTION OF REFERENCE NUMERALS

6 Cooling fan
10 Crankshaft
24 Turbocharger
42 Exhaust manifold
43 ATD (exhaust gas purification device)
52 Second exhaust pipe (connection pipe)
100 Engine

The invention claimed is:

1. An engine comprising:
an engine body;
a crankshaft extending in a second direction, which is a direction perpendicular to a first direction, the first direction being a height direction;
a cooling fan arranged on one side of the engine body in the second direction;
an exhaust manifold;
a turbocharger to be driven by exhaust gas from the exhaust manifold;
an exhaust gas purification device to purify the exhaust gas from the exhaust manifold; and
a connection pipe to connect the turbocharger and the exhaust gas purification device,
wherein the exhaust gas purification device is arranged in such a posture that a longitudinal direction thereof is parallel to the second direction,
the connection pipe is connected to a cooling fan side of the exhaust gas purification device in the second direction, and
the connection pipe is arranged on a side of the exhaust manifold so as to pass below the turbocharger.

2. An engine according to claim 1,
wherein, when a direction perpendicular to both of the first direction and the second direction is a third direction, the turbocharger is arranged on one side of the engine body in the third direction, and the connection pipe is arranged on a side of the turbocharger that is near the engine body in the third direction relative to an end part on a side of the turbocharger that is far from the engine body in the third direction.

3. The engine according to claim 1,
wherein the connection pipe has a straight part extending in parallel to the second direction, and
the exhaust manifold and the turbocharger are arranged above a lower end of the straight part.

4. An engine according to claim 3,
wherein, when a direction that is perpendicular to both of the first direction and the second direction is a third direction, the turbocharger is arranged on one side of the engine body in the third direction,
when viewed in an orientation along the third direction, the straight part is arranged so as to at least partially overlap the exhaust manifold and be vertically adjacent to the turbocharger, and
when viewed in an orientation along the second direction, the straight part is arranged so as to be mutually adjacent to the exhaust manifold in the third direction.

* * * * *